United States Patent
Kosugi et al.

(10) Patent No.: US 10,327,304 B2
(45) Date of Patent: Jun. 18, 2019

(54) LIGHT EMITTING DEVICE FOR VEHICLE, LIGHTING DEVICE FOR VEHICLE, AND LIGHTING TOOL FOR VEHICLE

(71) Applicant: Toshiba Lighting & Technology Corporation, Yokosuka-shi, Kanagawa-ken (JP)

(72) Inventors: Daisuke Kosugi, Yokosuka (JP); Atsushi Heike, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 150 days.

(21) Appl. No.: 15/195,173

(22) Filed: Jun. 28, 2016

(65) Prior Publication Data

US 2017/0009953 A1 Jan. 12, 2017

(30) Foreign Application Priority Data

Jul. 10, 2015 (JP) .................................. 2015-138668

(51) Int. Cl.
| | |
|---|---|
| *H05B 33/08* | (2006.01) |
| *F21S 43/19* | (2018.01) |
| *F21S 43/14* | (2018.01) |
| *F21S 45/10* | (2018.01) |
| *F21S 45/47* | (2018.01) |
| *F21S 45/50* | (2018.01) |
| *F21S 45/48* | (2018.01) |
| *B60Q 1/00* | (2006.01) |

(52) U.S. Cl.
CPC ............ *H05B 33/089* (2013.01); *F21S 43/14* (2018.01); *F21S 43/195* (2018.01); *F21S 45/10* (2018.01); *F21S 45/47* (2018.01); *F21S 45/48* (2018.01); *F21S 45/50* (2018.01); *B60Q 1/0023* (2013.01)

(58) Field of Classification Search
CPC .. F21S 48/31; F21S 45/48; F21S 45/50; F21S 45/47; F21S 45/10; F21S 43/14; F21S 43/195; H05B 33/089; B60Q 1/0023
See application file for complete search history.

(56) References Cited

U.S. PATENT DOCUMENTS

| | | | |
|---|---|---|---|
| 5,939,839 A | 8/1999 | Robel et al. | |
| 2004/0179359 A1* | 9/2004 | Miyawaki | F21K 9/00 362/230 |
| 2007/0278513 A1* | 12/2007 | Chikugawa | H01L 33/54 257/100 |

(Continued)

FOREIGN PATENT DOCUMENTS

| | | |
|---|---|---|
| DE | 10 2005 018175 A1 | 10/2006 |
| GB | 2466788 A | 7/2010 |

(Continued)

OTHER PUBLICATIONS

Dec. 16, 2016—(EP) Extended Search Report—App 16176854.4.

*Primary Examiner* — Liliana Cerullo
(74) *Attorney, Agent, or Firm* — Banner & Witcoff, Ltd.

(57) ABSTRACT

A light emitting device for a vehicle includes a substrate; a light emitting element which is provided on the substrate; a resistive element which is provided on the substrate, and connected in series with the light emitting element; and a thermistor which is provided on the substrate. The thermistor has a positive temperature coefficient, and is connected in parallel with the resistive element.

17 Claims, 5 Drawing Sheets

(56) References Cited

U.S. PATENT DOCUMENTS

| | | |
|---|---|---|
| 2008/0143275 A1 | 6/2008 | Hoffman |
| 2009/0021181 A1 | 1/2009 | Brune et al. |
| 2009/0295292 A1* | 12/2009 | Harmgardt ......... H05B 33/0803 |
| | | 315/51 |
| 2011/0090703 A1 | 4/2011 | Ishimori et al. |
| 2011/0260192 A1* | 10/2011 | Kwak ..................... H01L 33/56 |
| | | 257/98 |
| 2012/0032182 A1* | 2/2012 | Sills .................... H01L 25/0753 |
| | | 257/76 |
| 2012/0068606 A1* | 3/2012 | Otake ............... H05B 33/0815 |
| | | 315/125 |
| 2012/0267647 A1* | 10/2012 | Kim ................... H01L 25/0753 |
| | | 257/88 |
| 2013/0092962 A1* | 4/2013 | Paek ....................... H01L 33/62 |
| | | 257/88 |
| 2013/0193851 A1 | 8/2013 | Alon et al. |
| 2013/0241408 A1 | 9/2013 | Sasaki et al. |
| 2014/0252947 A1 | 9/2014 | Chou et al. |
| 2016/0053974 A1 | 2/2016 | Hino |

FOREIGN PATENT DOCUMENTS

| | | |
|---|---|---|
| JP | 2000-278859 A | 10/2000 |
| JP | 2000278859 * | 10/2000 |
| JP | 2002-237645 A | 8/2002 |
| JP | 2002237645 * | 8/2002 |
| JP | 2007-055424 A | 3/2007 |
| JP | 2011-519149 A | 6/2011 |
| JP | 2012-104689 A | 5/2012 |
| JP | 2014-220154 A | 11/2014 |

\* cited by examiner

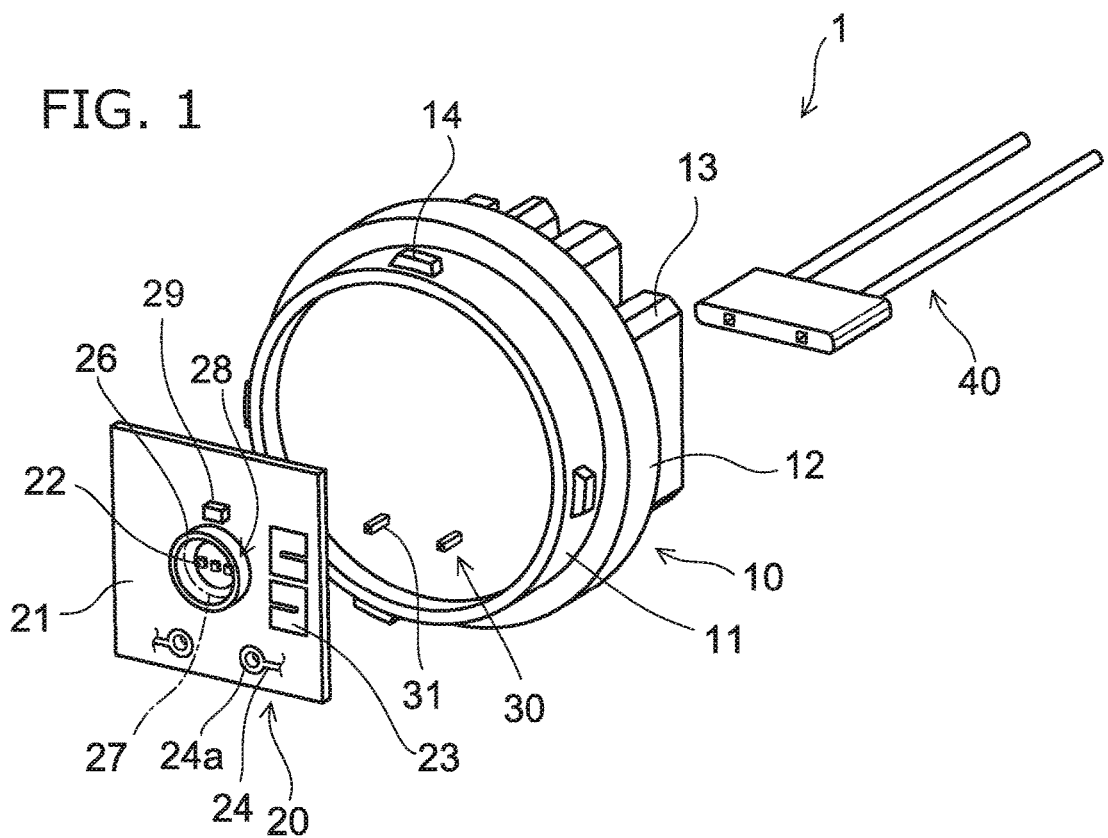
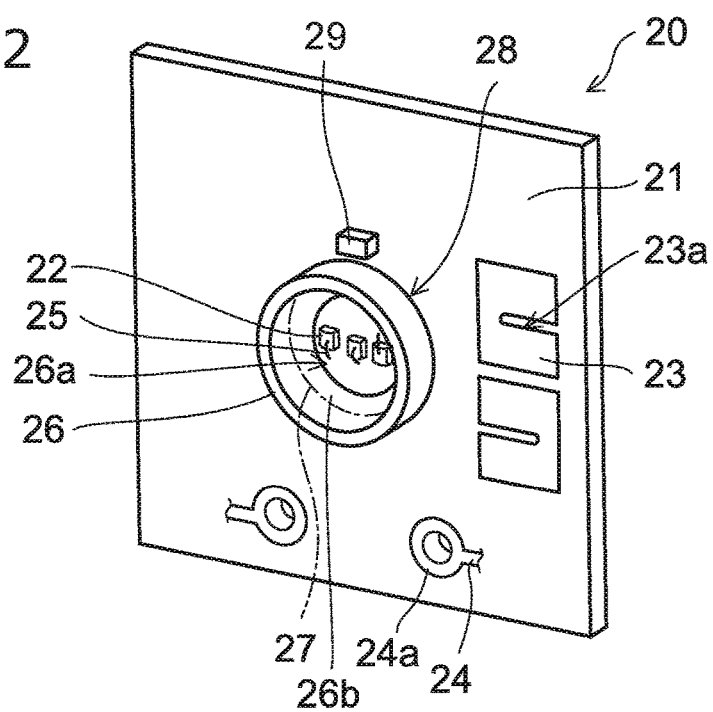

LIGHT EMITTING DEVICE FOR VEHICLE, LIGHTING DEVICE FOR VEHICLE, AND LIGHTING TOOL FOR VEHICLE

CROSS-REFERENCE TO RELATED APPLICATIONS

This application is based upon and claims the benefit of priority from Japanese Patent Application No. 2015-138668, filed on Jul. 10, 2015; the entire contents of which are incorporated herein by reference.

FIELD

Embodiments described herein relate to a light emitting device for vehicle, a lighting device for vehicle, and a lighting tool for vehicle.

BACKGROUND

In recent years, a lighting device for vehicle in which a light emitting diode (LED) is used as a light source, instead of an incandescent lamp (filament lamp), is put to practical use.

In addition, a parallel resistance circuit in which a circuit formed by connecting a resistive element and a thermistor with a positive temperature coefficient in series is connected in parallel to a resistive element which is connected in series to a light emitting diode is proposed.

The thermistor provided in the parallel resistance circuit is operated due to heat which is generated in a resistive element or a protection circuit case when an overvoltage is applied. When an overvoltage is applied, the thermistor enters a non-energized state, regardless of a temperature rise of the light emitting diode, and a current which flows through the thermistor is blocked.

In addition, it is necessary to set a lighting device for vehicle to be used even in a high temperature and high humidity environment in which an environmental temperature is 85° C., and humidity is 85%, for example.

For this reason, when an environmental temperature is high, there is concern that a temperature of a light emitting diode may become excessively high, even when an overvoltage is not applied.

In addition, a temperature compensation circuit which includes a thermistor which is connected in series to a laser diode, and has a negative temperature coefficient, and a resistive element connected in parallel to the thermistor with the negative temperature coefficient is proposed. In this case, when a temperature of the laser diode rises, a light output decreases; however, a voltage applied to the laser diode increases, since a resistance of the thermistor decreases, when a temperature of the thermistor rises. When a voltage applied to the laser diode increases, a light output of the laser diode increases.

As described above, it is necessary to set the lighting device for vehicle to be used even in a high temperature and high humidity environment in which an environmental temperature is 85° C., and humidity is 85%, for example.

For this reason, when a voltage applied to the laser diode is increased in a case of a high environmental temperature, a temperature of the laser diode further rises.

Therefore, a development of a technology in which it is possible to suppress an excessive temperature rise of a light emitting element, even when an environmental temperature is high, is desired.

DESCRIPTION OF THE DRAWINGS

FIG. 1 is a schematic perspective view which illustrates a light emitting device for vehicle, and a lighting device for vehicle according to one embodiment.

FIG. 2 is a schematic perspective view of the light emitting device for vehicle.

DETAILED DESCRIPTION

Figure 3:
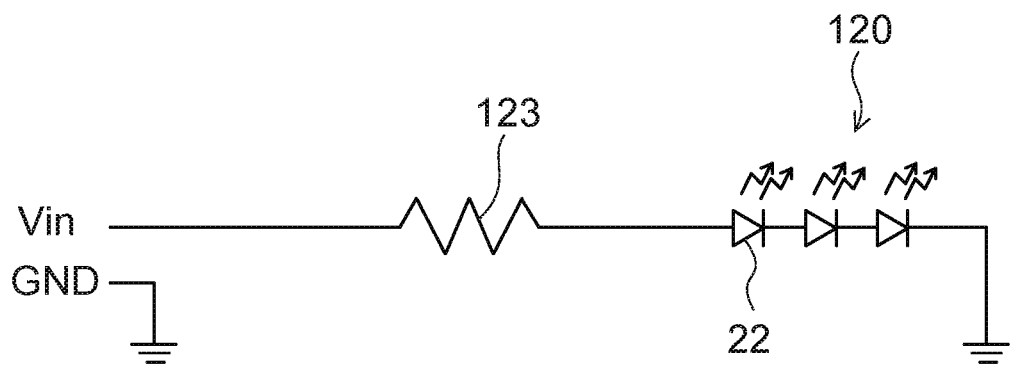
FIG. 3 is a circuit diagram of a light emitting device for vehicle according to a comparison example.

An exemplary embodiment according to one embodiment is a light emitting device for vehicle which includes a substrate; a light emitting element which is provided on the substrate; a resistive element which is provided on the substrate, and is connected in series to the light emitting element; and a thermistor which is provided on the substrate, has a positive temperature coefficient, and is connected in parallel to the resistive element.

According to the light emitting device for vehicle, it is possible to suppress an excessive temperature rise of the light emitting element, even when an environmental temperature is high.

In this case, heat conductivity of the substrate may be set to 1 W/(mK) or more and 200 W/(mK) or less.

In this manner, it is possible to set so that there is almost no difference in temperature between the thermistor and the light emitting element, regardless of positions on the substrate.

In the device, a distance between the thermistor and the light emitting element on the substrate may be set to 10 mm or less.

In this manner, even when heat conductivity of the substrate is low, it is possible to set so that there is almost no difference in temperature between the thermistor and the light emitting element.

In the device, a distance between the thermistor and the resistive element on the substrate may be set to be longer than the distance between the thermistor and the light emitting element.

In this manner, it is possible to easily control a junction temperature of the light emitting element, since an influence caused by heat generation of the resistive element can be suppressed.

In the device, the resistive element may be an adjustable resistor, or a film-shaped resistor which is provided on the substrate.

A resistance value of the resistive element may be set to a value in which a value of a current which flows in the thermistor is within a desired range in an environmental temperature region (high temperature region) of approximately 85° C. (more preferably approximately 105° C.), and a value of a current which flows in the light emitting element is within a desired range in an environmental temperature region (normal temperature region) of approximately 25° C.

In this manner, it is possible to reduce a variation in temperature-current characteristics of a parallel circuit which is formed of the resistive element and the thermistor, in an environmental temperature region (high temperature region) of approximately 85° C. (more preferably approximately 105° C.), even when there is a variation in temperature-current characteristics of the thermistor.

In addition, it is possible to cause brightness of light (light flux, luminance, intensity of light, illumination) which is radiated from a light emitting element 22 in a normal temperature region (for example, at time of starting) to be within a desired range.

An exemplary embodiment according to another embodiment is a lighting device for vehicle which includes the above described light emitting device for vehicle; a power feeding terminal which is electrically connected to a light emitting element provided in the light emitting device for vehicle; and a socket which is fitted into the power feeding terminal.

According to the lighting device for vehicle, it is possible to suppress an excessive temperature rise of the light emitting element even when an environmental temperature is high.

An exemplary embodiment according to still another embodiment is a lighting tool for vehicle which includes the above described lighting device for vehicle; and a housing to which the lighting device for vehicle is attached.

The lighting device for vehicle is attached to the housing so as to have an orientation in which a thermistor is located above a light emitting element which is provided in the light emitting device for vehicle.

According to the lighting tool for vehicle, it is possible to suppress an excessive temperature rise of the light emitting element even when an environmental temperature is high.

Hereinafter, one embodiment will be exemplified while referring to drawings. In addition, in each figure, the same constituent elements will be given the same reference numerals, and detailed descriptions will be appropriately omitted.

In addition, a light emitting device for vehicle 20, a lighting device for vehicle 1, and a lighting tool for vehicle 100 which will be exemplified below can be provided in a car, for example.

FIG. 1 is a schematic perspective view which illustrates the light emitting device for vehicle 20, and the lighting device for vehicle 1 according to one embodiment.

FIG. 2 is a schematic perspective view of the light emitting device for vehicle 20.

As illustrated in FIG. 1, a main body unit 10, the light emitting device for vehicle 20, a power feeding unit 30, and a socket 40 are provided in the lighting device for vehicle 1.

An accommodation unit 11, a flange portion 12, a fin 13, and a protrusion portion 14 are provided in the main body unit 10.

The accommodation unit 11 is formed in a cylindrical shape, and protrudes from one face of the flange portion 12. The light emitting device for vehicle 20 is accommodated inside the accommodation unit 11. In addition, a power feeding terminal 31 of the power feeding unit 30 protrudes to the inside of the accommodation unit 11.

The flange portion 12 is formed in a disk shape, the accommodation unit 11 is provided on one face thereof, and the fin 13 is provided on the other face.

A plurality of the fins 13 are provided, by protruding from a face of the flange portion 12. The plurality of fins 13 are formed in a plate shape, and function as heat radiating fins.

The protrusion portion 14 is provided on a side wall of the accommodation unit 11. The protrusion portion 14 protrudes toward the outside from the side wall of the accommodation unit 11.

The number of protrusion portions 14, or an arranging position thereof is not particularly limited.

In this case, when a plurality of the protrusion portions 14 are provided, it is possible to stably hold the lighting device for vehicle 1.

In order to stably hold the lighting device for vehicle 1, it is preferable to provide three or more protrusion portions 14. In a case of the protrusion portion 14 which is illustrated in FIG. 1, four protrusion portions 14 are provided.

Here, the main body unit 10 has a function of accommodating the light emitting device for vehicle 20, and a function of radiating heat which is generated in the light emitting device for vehicle 20 to the outside of the lighting device for vehicle 1.

For this reason, when considering radiating of heat to the outside, it is preferable to form the main body unit 10 using a material with high heat conductivity.

It is possible to form the main body unit 10 using, for example, metal such as aluminum, a resin with high heat conductivity, or the like.

The resin with high heat conductivity is a resin in which a fiber or particles formed of carbon with high heat conductivity, or the like, is mixed into a resin of, for example, polyethylene terephthalate (PET), nylon, or the like.

It is preferable to make the lighting device for vehicle 1 lightweight.

For this reason, it is preferable to form the main body unit 10 using a resin with high heat conductivity.

In addition, it is possible to integrally mold the accommodation unit 11, the flange portion 12, the fin 13, and the protrusion portion 14.

In addition, it is also possible to separately form the accommodation unit 11, the flange portion 12, the fin 13, and the protrusion portion 14, and bond these elements. When the accommodation unit 11, the flange portion 12, the fin 13, and the protrusion portion 14 are separately formed, it is also possible to form these elements using the same material, or using different materials.

In addition, when a main portion of the main body unit 10 is formed of a conductive material, it is possible to cover the periphery of the power feeding terminal 31 using an insulating material (not illustrated), in order to secure electric insulation between the power feeding terminal 31 and the main body unit 10 which is formed of a conductive material. It is preferable to use a resin with high heat conductivity, or the like, as the insulating material, for example.

A plurality of the power feeding terminals 31 are provided in the power feeding unit 30.

The plurality of power feeding terminals 31 extend inside the accommodation unit 11 and the flange portion 12. One end portion of the plurality of power feeding terminals 31 protrudes from a bottom face of the accommodation unit 11, and is electrically connected to a wiring pattern 24 (light emitting element 22).

The other end portion of the plurality of power feeding terminals 31 is exposed from a side of the main body unit 10 which is opposite to a side on which the light emitting device for vehicle 20 is provided.

In addition, an arrangement, a form, or the like, of the power feeding terminal 31 is not limited to exemplifications, and can be appropriately changed.

In addition, the power feeding unit 30 can also be provided with a substrate (not illustrated), a capacitor, a resistor, and the like. In addition, the substrate (not illustrated), and the like, can be provided inside the accommodation unit 11 or the flange portion 12, for example.

The socket 40 is fitted into end portions of the plurality of power feeding terminals 31 which are exposed from the main body unit 10.

A power supply (not illustrated), or the like, is electrically connected to the socket 40.

For this reason, the power supply (not illustrated), or the like, and the light emitting element 22 are electrically connected when the socket 40 is fitted into the end portion of the power feeding terminal 31.

The socket 40 can be jointed to elements on the main body unit 10 side using an adhesive, or the like, for example.

As illustrated in FIG. 2, a substrate 21, the light emitting element 22, a resistive element 23, the wiring pattern 24, wiring 25, a frame portion 26, a sealing portion 27, a joint portion 28, and a thermistor 29 are provided in the light emitting device for vehicle 20.

The substrate 21 is provided inside the accommodation unit 11.

The substrate 21 is formed in a plate shape, and the wiring pattern 24 is provided on the surface thereof.

The substrate 21 can be formed of, for example, an inorganic material (ceramic) such as aluminum oxide, aluminum nitride, or the like, and an organic material such as paper phenol, glass epoxy, or the like. In addition, the substrate 21 may be a substrate which is formed by covering a surface of a metal plate using an insulating material. In addition, when the surface of the metal plate is covered by an insulating material, the insulating material may be formed of an organic material, or may be formed of an inorganic material.

In addition, the substrate 21 may be a single-layer structure, or a multi-layer structure.

The wiring pattern 24 is provided on at least one surface of the substrate 21.

It is also possible to provide the wiring pattern 24 on both faces of the substrate 21; however, it is preferable to provide the wiring pattern on one face of the substrate 21 in order to reduce a manufacturing cost;

An input terminal 24*a* is provided in the wiring pattern 24.

A plurality of the input terminals 24*a* are provided. The power feeding terminal 31 is electrically connected to the input terminal 24*a*.

The light emitting element 22 is mounted on the wiring pattern 24 which is provided on the surface of the substrate 21, using a chip on board (COB) method.

For this reason, the light emitting element 22 is electrically connected to the power feeding terminal 31 through the wiring pattern 24.

The light emitting element 22 can include an electrode (not illustrated) on a face (top face) on a side opposite to the side on which the light emitting element is provided in the wiring pattern 24. In addition, an electrode (not illustrated) may be provided on a face (lower face) on a side on which the light emitting element is provided in the wiring pattern 24, and the face (top face) on the side opposite to the side on which the light emitting element is provided in the wiring pattern 24, and may be provided on only one face thereof.

An electrode (not illustrated) which is provided on the lower face of the light emitting element 22 is electrically connected to a mounting pad which is provided in the wiring pattern 24 through a conductive thermosetting material such as silver paste. An electrode (not illustrated) which is provided on the top face of the light emitting element 22 is electrically connected to a wiring pad which is provided in the wiring pattern 24 through the wiring 25.

The light emitting element 22 can be set to, for example, a light emitting diode, an organic light emitting diode, a laser diode, or the like.

A top face of the light emitting element 22 as a light emission surface of light faces a front face side of the lighting device for vehicle 1, and the light emitting element mainly radiates light toward the front face side of the lighting device for vehicle 1.

The number, a size, or the like, of the light emitting element 22 is not limited to exemplifications, and can be appropriately changed according to a size, a use, or the like, of the lighting device for vehicle 1.

For example, there can be one, or a plurality of light emitting elements 22. When the plurality of light emitting elements 22 are provided, it is possible to connect the plurality of light emitting elements 22 in series.

The resistive element 23 is provided on the wiring pattern 24.

The resistive element 23 is connected in series to the light emitting element 22.

The resistive element 23 controls a current which flows in the light emitting element 22.

In addition, the resistive element 23 will be described in detail later.

The wiring 25 can be set to, for example, a wire of which a main component is gold. However, a material of the wiring 25 is not limited to the material of which a main component is gold. A material of the wiring 25 may be a material, for example, of which a main component is copper, aluminum, or the like.

The wiring 25 is electrically connected to the electrode (not illustrated) provided on the top face of the light emitting element 22, and the wiring pad which is provided in the wiring pattern 24, using ultrasonic welding or heat welding, for example. The wiring 25 can be electrically connected to the electrode (not illustrated) provided on the top face of the light emitting element 22, and the wiring pad which is provided in the wiring pattern 24 using a wire bonding method, for example.

The frame portion 26 is provided on the substrate 21 so as to surround the plurality of light emitting elements 22. The frame portion 26 is formed in an annular shape, for example, and the plurality of light emitting elements 22 are arranged at a center portion 26*a*.

The frame portion 26 can be formed of, for example, a resin of polybutylene terephthalate (PBT), polycarbonate (PC), or the like, or ceramic, or the like.

In addition, when a material of the frame portion 26 is set to a resin, it is possible to improve reflectivity with respect to light radiated from the light emitting element 22 by mixing particles of titanium oxide, or the like.

In addition, it is not limited to the particles of titanium oxide, and particles which are formed of a material with high reflectivity with respect to light radiated from the light emitting element 22 may be mixed.

In addition, the frame portion 26 can also be formed of a white resin, for example.

A side wall face 26b of the frame portion 26 on the center portion 26a side is an inclined face. Part of light radiated from the light emitting element 22 is reflected on the side wall face 26b of the frame portion 26, and is radiated toward the front face side of the lighting device for vehicle 1.

In addition, light which is part of light radiated toward the front face side of the lighting device for vehicle 1 from the light emitting element 22, and is totally reflected on a top face of the sealing portion 27 (interface between sealing portion 27 and ambient air) is reflected on the side wall face 26b of the frame portion 26 on the center portion 26a side, and is reradiated toward the front face side of the lighting device for vehicle 1.

That is, the frame portion 26 can also function as a reflector. In addition, a form of the frame portion 26 is not limited to exemplifications, and can be appropriately changed.

In addition, a configuration in which the frame portion 26 is provided is exemplified; however, it may be a configuration in which the frame portion 26 is omitted. Whether or not the frame portion 26 is necessary can be appropriately determined according to specifications, or the like, of the light emitting device for vehicle 20.

The sealing portion 27 is provided in the center portion 26a of the frame portion 26. The sealing portion 27 is provided so as to cover the inside of the frame portion 26. That is, the sealing portion 27 is provided inside the frame portion 26, and covers the light emitting element 22, the wiring 25, and the wiring pattern 24 which is arranged in the center portion 26a of the frame portion 26.

The sealing portion 27 is formed of a material with light transmittance. The sealing portion 27 can be formed of, for example, a silicone resin, or the like.

The sealing portion 27 can be formed, for example, by filling the center portion 26a of the frame portion 26 with a resin. Filling of a resin can be performed, for example, by using a quantitative liquid ejecting device such as a dispenser.

When a resin is filled in the center portion 26a of the frame portion 26, it is possible to suppress a mechanical contact from the outside with respect to the light emitting element 22, the wiring pattern 24, the wiring 25, and the like, which are arranged at the center portion 26a of the frame portion 26. In addition, it is possible to prevent moisture, gas, or the like, from attaching to the light emitting element 22, and the wiring pattern 24, the wiring 25, and the like, which are arranged at the center portion 26a of the frame portion 26. For this reason, it is possible to improve reliability of the light emitting device for vehicle 20.

In addition, it is possible to contain a phosphor in the sealing portion 27. The phosphor can be, for example, an yttrium-aluminum-garnet phosphor (YAG-based phosphor).

For example, when the light emitting element 22 is a blue light emitting diode, and the phosphor is the YAG-based phosphor, the YAG-based phosphor is exited due to blue light which is radiated from the light emitting element 22, and yellow fluorescence is radiated from the YAG-based phosphor. In addition, white light is radiated from the light emitting device for vehicle 20 when the blue light and the yellow light are mixed together. In addition, a type of the phosphor, or a type of the light emitting element 22 is not limited to exemplifications, and the type can be appropriately changed so as to obtain a desired luminescent color according to a use, or the like, of the light emitting device for vehicle 20.

A configuration in which the sealing portion 27 is provided is exemplified; however, it may be a configuration in which the sealing portion 27 is omitted. Whether or not the sealing portion 27 is necessary can be appropriately determined according to specifications, or the like, of the light emitting device for vehicle 20.

The joint portion 28 joints the frame portion 26 and the substrate 21.

The joint portion 28 is formed in a film shape, and is provided between the frame portion 26 and the substrate 21.

The joint portion 28 can be formed by hardening a silicone-based adhesive or an epoxy-based adhesive, for example.

The thermistor 29 is provided on the wiring pattern 24.

The thermistor 29 is connected in parallel to the resistive element 23.

The thermistor 29 has a positive temperature coefficient.

The thermistor 29 prevents a junction temperature of the light emitting element 22 from excessively rising, by setting a value of a current which flows in the light emitting element 22 to be within a predetermined range when an environmental temperature is high. In addition, the thermistor 29 will be described in detail later.

Subsequently, the resistive element 23 and the thermistor 29 will be further described.

In addition, hereinafter, a case in which the light emitting element 22 is a light emitting diode will be described.

FIG. 3 is a circuit diagram of a light emitting device for vehicle 120 according to a comparison example.

Figure 4:
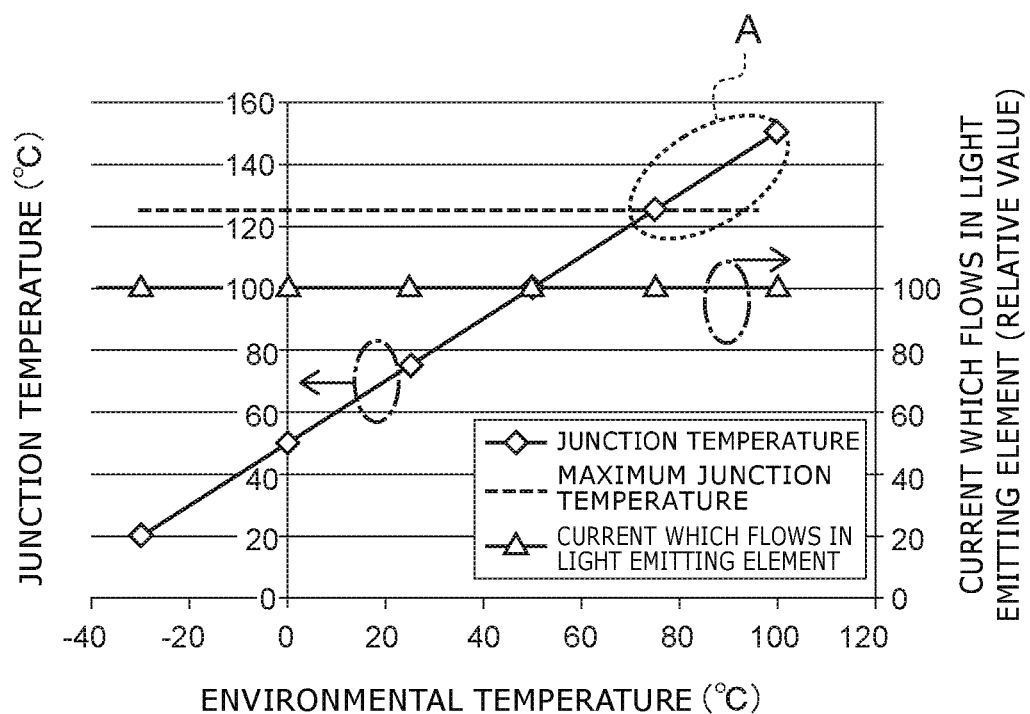
FIG. 4 is a graph which exemplifies a relationship between a junction temperature of a light emitting element as a light emitting diode and an environmental temperature.

FIG. 4 is a graph which exemplifies a relationship between a junction temperature of the light emitting element 22 as a light emitting diode and an environmental temperature.

As illustrated in FIG. 3, the light emitting device for vehicle 120 according to the comparison example includes a resistive element 123, and three light emitting elements 22.

In addition, the resistive element 123, and the three light emitting elements 22 are connected in series between an input terminal and a ground terminal (GND).

When a voltage Vin is applied to the input terminal, currents with the same value flow in the resistive element 123, and the three light emitting elements 22 which are connected in series, respectively.

In this case, since a resistance value of the resistive element 123 is approximately constant, regardless of an environmental temperature, also a value of a current which flows in the resistive element 123 becomes approximately constant.

For this reason, as illustrated in FIG. 4, a value of the current which flows in the respective three light emitting elements 22 becomes approximately constant, regardless of an environmental temperature.

In contrast to this, a junction temperature of the light emitting element 22 is determined by a heating value corresponding to a value of a current which flows in the light emitting element 22, and an environmental temperature.

In this case, since a value of a current which flows in the emitting element 22 becomes approximately constant, a temperature rise caused by heat generation is also converged on an approximately constant value.

However, it is necessary to set the light emitting device for vehicle 20 to be used even in a high temperature and high humidity environment in which an environmental temperature is 85° C., and humidity is 85%.

For this reason, as illustrated in FIG. 4, a junction temperature of the light emitting element 22 rises along with a rise of an environmental temperature.

In addition, as denoted by a portion A in FIG. 4, when a junction temperature of the light emitting element 22 exceeds a maximum junction temperature, there is a concern that the light emitting element 22 may be damaged.

In this case, when a value of a current which flows in the light emitting element 22 is limited so that a junction temperature of the light emitting element 22 does not exceed the maximum junction temperature even when an environmental temperature is high, there is a concern that brightness of light radiated from the light emitting element 22 in a normal temperature region (for example, at time of starting) may fall behind a predetermined value.

Figure 5:
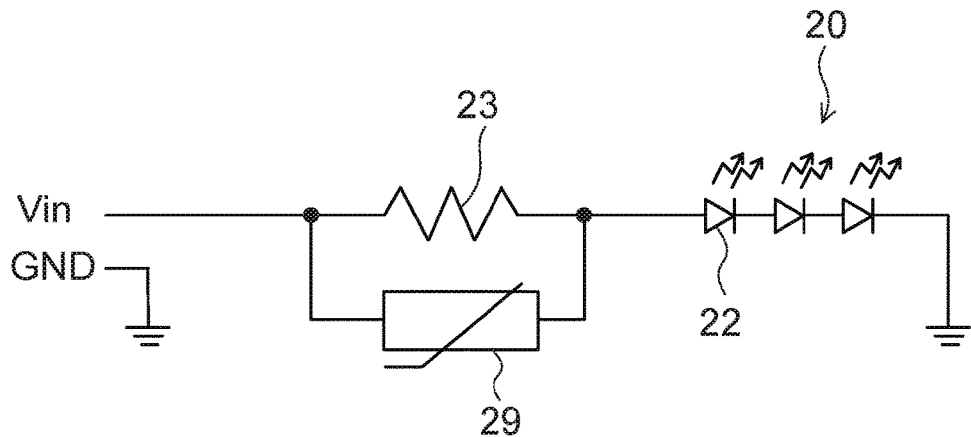
FIG. 5 is a circuit diagram of the light emitting device for vehicle according to the embodiment.

FIG. 5 is a circuit diagram of the light emitting device for vehicle 20 according to the embodiment.

Figure 6:
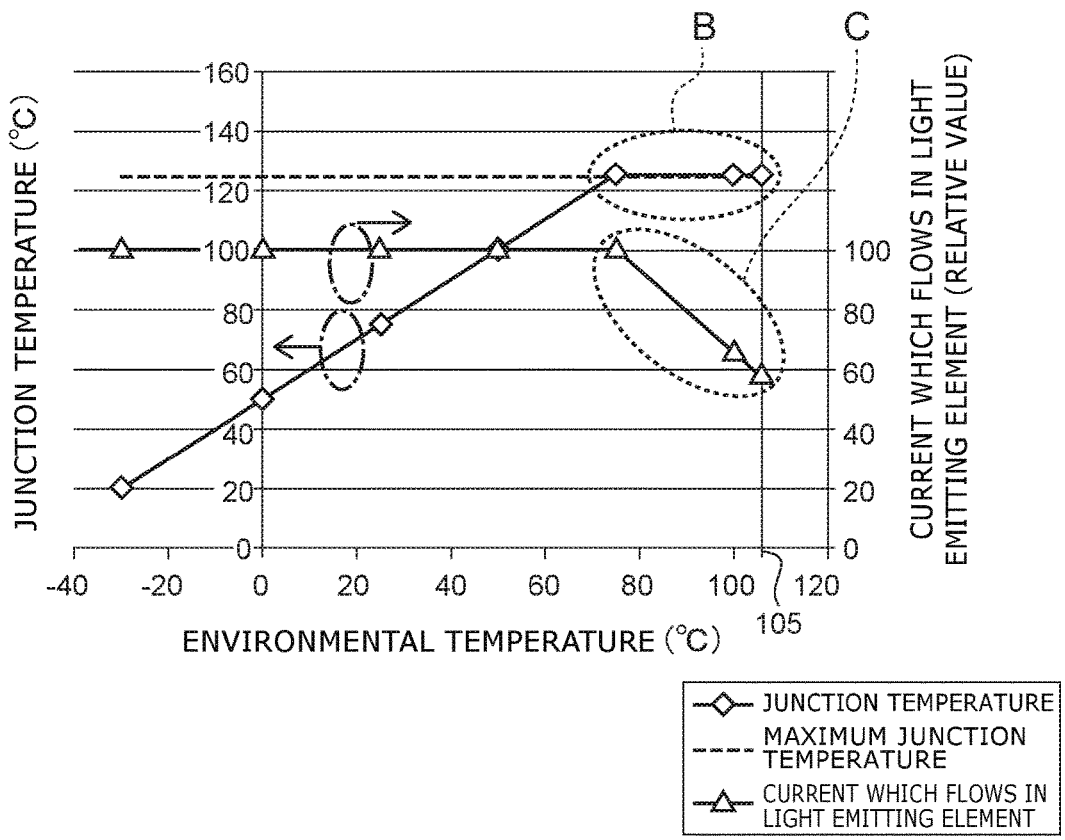
FIG. 6 is a graph which exemplifies a relationship between a junction temperature of the light emitting element as the light emitting diode and an environmental temperature.

FIG. 6 is a graph which exemplifies a relationship between a junction temperature of the light emitting element 22 as the light emitting diode and an environmental temperature.

As illustrated in FIG. 5, the light emitting device for vehicle 20 according to the embodiment is provided with the resistive element 23, the thermistor 29, and three light emitting elements 22.

In addition, a parallel circuit which is formed of the resistive element 23 and the thermistor 29, and three light emitting elements 22 are connected in series between an input terminal and a ground terminal (GND).

When a voltage Vin is applied to the input terminal, currents with the same value flow in the parallel circuit which is formed of the resistive element 23 and the thermistor 29, and the three light emitting elements 22 which are connected in series, respectively.

In this case, since a resistance value of the resistive element 23 becomes approximately constant, regardless of an environmental temperature, a value of a current which flows in the resistive element 23 also becomes constant, regardless of an environmental temperature.

In contrast to this, the thermistor 29 has a positive temperature coefficient. For this reason, when an environmental temperature rises, a resistance value of the thermistor 29 increases.

As a result, when an environmental temperature rises, a value of combined resistance of the parallel circuit which is formed of the resistive element 23 and the thermistor 29 increases, and a value of a current which flows in the parallel circuit formed of the resistive element 23 and the thermistor 29 decreases. When the value of the current which flows in the parallel circuit formed of the resistive element 23 and the thermistor 29 decreases, also the value of the current which flows in the respective three light emitting elements 22 similarly decreases.

As described above, a junction temperature of the light emitting element 22 is determined by a heating value corresponding to the value of the current which flows in the light emitting element 22, and an environmental temperature.

According to the embodiment, since it is possible to decrease a value of a current which flows in the light emitting element 22 along with a rise of an environmental temperature, as denoted by a portion B in FIG. 6, it is possible to set so that a junction temperature of the light emitting element 22 does not exceed a maximum junction temperature.

In this case, when Curie temperature of the thermistor 29 is excessively low, there is a concern that a value of a current which flows in the light emitting element 22 may become excessively small in a region in which an environmental temperature is high. As a result, there is a concern that brightness of light radiated from the light emitting element 22 may become excessively low in the region in which the environmental temperature is high. When Curie temperature of the thermistor 29 is excessively high, there is a concern that a value of a current which flows in the light emitting element 22 may become excessively large in the region in which the environmental temperature is high. As a result, there is a concern that a junction temperature of the light emitting element 22 may exceed the maximum junction temperature.

For this reason, as denoted by a portion C in FIG. 6, when an environmental temperature exceeds a predetermined value, it is preferable to set so that a value of a current which flows in the respective three light emitting elements 22 is decreased.

Here, an environmental temperature of the light emitting device for vehicle 20 is set to −40° C. to 85° C., more preferably to −40° C. to 105° C.

According to a knowledge which the inventors obtained, when considering the environmental temperature of 85° C. (more preferably 105° C.), it is preferable to set Curie temperature of the thermistor 29 to 65° C. or more and 140° C. or less.

Subsequently, the parallel circuit which is formed of the resistive element 23 and the thermistor 29 will be further described.

Figure 7:
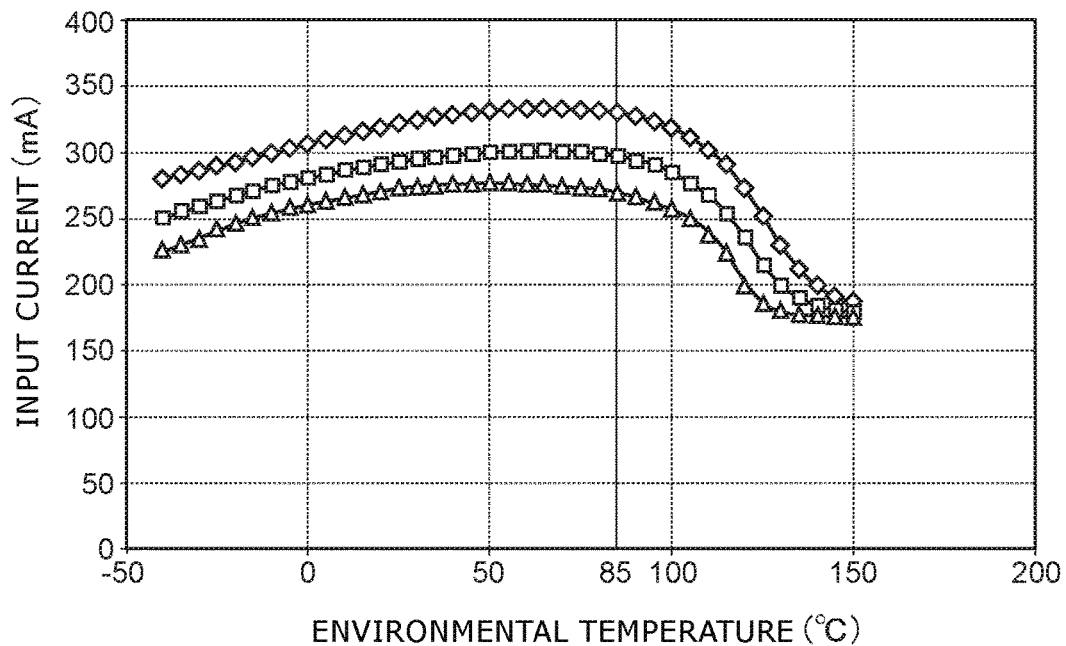
FIG. 7 is a graph which exemplifies a variation in temperature-current characteristics in a parallel circuit which is formed of a resistive element and a thermistor.

FIG. 7 is a graph which exemplifies a variation in temperature-current characteristics in the parallel circuit which is formed of the resistive element 23 and the thermistor 29.

Since a resistance value of the resistive element 23 becomes approximately constant, regardless of an environmental temperature, a value of a current which flows in the resistive element 23 also becomes approximately constant regardless of an environmental temperature.

In contrast to this, there is a variation in temperature-current characteristics of the thermistor 29.

For this reason, as illustrated in FIG. 7, temperature-current characteristics of the parallel circuit which is formed of the resistive element 23 and the thermistor 29 varies.

When temperature-current characteristics of the parallel circuit which is formed of the resistive element 23 and the thermistor 29 in an environmental temperature of approximately 85° C. varies, it is difficult to control a junction temperature of the light emitting element 22.

For this reason, in the light emitting device for vehicle 20 according to the embodiment, a resistance value of the resistive element 23 is adjusted according to a variation in temperature-current characteristics of the thermistor 29.

Figure 8:
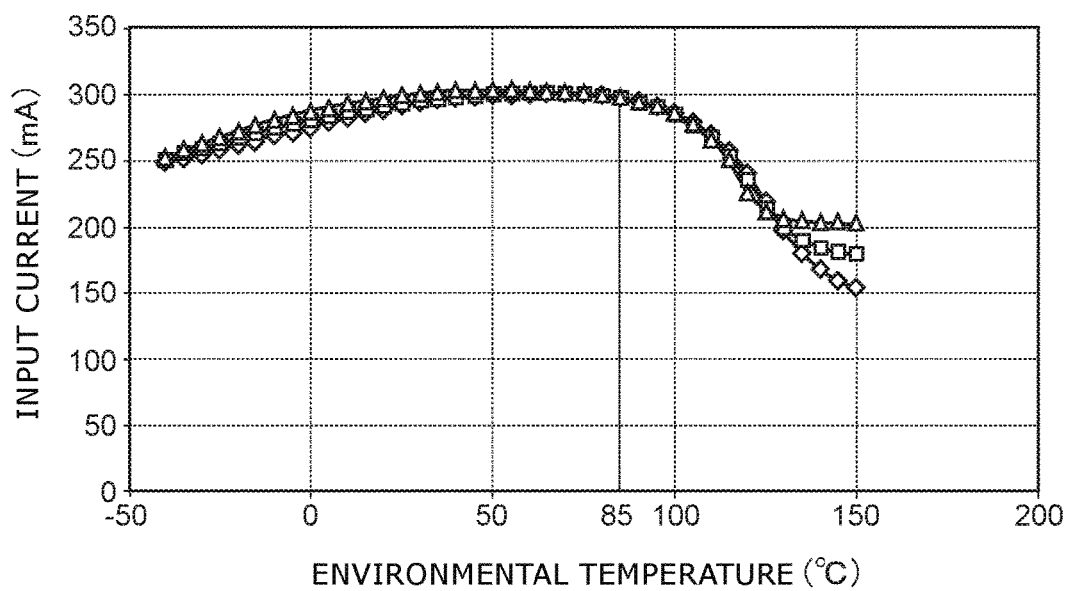
FIG. 8 is a graph which exemplifies an effect which is obtained by adjusting a resistance value of the resistive element.

FIG. 8 is a graph which exemplifies an effect which is obtained by adjusting a resistance value of the resistive element 23.

For example, when a value of a current which flows in the thermistor 29 is larger than a desired value, a resistance value of the resistive element 23 is decreased, and the value of the current which flows in the thermistor 29 is decreased.

When a value of a current which flows in the thermistor 29 is smaller than a desired value, a resistance value of the resistive element 23 is increased, and the value of the current which flows in the thermistor 29 is increased.

In this manner, as illustrated in FIG. 8, it is possible to reduce a variation in temperature-current characteristics of the parallel circuit which is formed of the resistive element 23 and the thermistor 29.

Subsequently, adjusting of a resistance value of the resistive element 23 will be further described.

A resistive element with a desired resistance value (for example, surface-mounted resistor (chip resistor), resistor with lead wire (metal oxide film resistor), or the like) is selected according to temperature-current characteristics of the thermistor 29 which is measured in advance, and it is possible to electrically connect the selected resistive element to the wiring pattern 24.

However, it causes complexity in a manufacturing process, or a reduction in productivity by doing so.

For this reason, the resistive element 23 can be set to an adjustable resistor.

When the resistive element 23 is set to the adjustable resistor, it is possible to adjust a resistance value of the resistive element 23 which is electrically connected to the wiring pattern 24, according to temperature-current characteristics of the thermistor 29, by electrically connecting the resistive element 23 to the wiring pattern 24 in advance.

In this manner, it is possible to make a manufacturing process simple, and improve productivity.

In addition, it is also possible to adjust a resistance value by setting the resistive element 23 to a film-shaped resistor, and eliminating a part of the resistive element 23.

The film-shaped resistor can include an elimination portion which is formed by eliminating a part of the film-shaped resistor.

A resistance value of the film-shaped resistor can be adjusted by using a size of the elimination portion. In this case, when a size of the elimination portion is set to be large, a resistance value of the film-shaped resistor increases.

For example, it is possible to adjust a resistance value of the resistive element 23 by eliminating a part of the resistive element 23 which is provided on the wiring pattern 24, according to temperature-current characteristics of the thermistor 29, by providing a film-shaped resistive element 23 on the wiring pattern 24 in advance.

In this case, when an elimination portion 23a is formed by eliminating a part of the resistive element 23, it is possible to increase a resistance value of the resistive element 23.

Eliminating of a part of the resistive element 23 (forming of the elimination portion 23a) can be performed, by radiating laser light to the resistive element 23.

The resistive element 23 can be set to a film-shaped resistor which contains ruthenium oxide ($RuO_2$), for example. It is possible to form the film-shaped resistive element 23 which contains ruthenium oxide using, for example, a screen printing method and a baking method.

The number, a size, arrangements, or the like, of the resistive element 23 is not limited to the exemplifications in FIG. 2, and can be appropriately changed according to the number, specifications, or the like, of the light emitting element 22.

Here, there is a variation in forward voltage characteristics of the light emitting element 22. For this reason, when an application voltage Vin between the input terminal and the ground terminal is set to be constant, a variation occurs in brightness of the light emitting element 22. For this reason, it is necessary to set brightness of the light emitting element 22 to be within a desired range, by setting a value of a current which flows in the light emitting element 22 to be within a desired range in an environmental temperature region (normal temperature region) of approximately 25° C.

Therefore, in the light emitting device for vehicle 20 according to the embodiment, a resistance value of the resistive element 23 is adjusted so that a value of a current which flows in the thermistor 29 is within a desired range, in an environmental temperature range (high temperature region) of approximately 85° C. (more preferably approximately 105° C.), and a value of a current which flows in the light emitting element 22 is within a desired range, in an environmental temperature range (normal temperature region) of approximately 25° C.

That is, a resistance value of the resistive element 23 is adjusted so that a junction temperature of the light emitting element 22 does not exceed the maximum junction temperature, in the environmental temperature range (high temperature region) of approximately 85° C. (more preferably approximately 105° C.), and brightness of the light emitting element 22 is set to a value within a desired range, in the environmental temperature range (normal temperature region) of approximately 25° C.

In addition, characteristics of the thermistor 29 in the environmental temperature range (high temperature region) of approximately 85° C. (more preferably approximately 105° C.), and characteristics of the light emitting element 22 in the environmental temperature range (normal temperature region) of approximately 25° C. may be measured in advance in a component level.

Subsequently, arrangements of the light emitting element 22, the resistive element 23, and the thermistor 29 will be further described.

As described above, the thermistor 29 is provided so as to prevent the junction temperature of the light emitting element 22 from excessively rising.

For this reason, when a temperature of the thermistor 29 is set to be approximately the same as that of the light emitting element 22, it is easy to control the junction temperature of the light emitting element 22.

In this case, when a distance between the thermistor 29 and the light emitting element 22 on the substrate 21 is set to be short, it is possible to make a difference in temperature between the thermistor 29 and the light emitting element 22 small.

In addition, when the substrate 21 is formed of a material with high heat conductivity, it is possible to make a difference in temperature between the thermistor 29 and the light emitting element 22 small, even when the distance between the thermistor 29 and the light emitting element 22 on the substrate 21 is a little long.

According to a knowledge which the inventors obtained, when heat conductivity of the substrate 21 is set to 1 W/(mK) or more and 200 W/(mK) or less, it is possible to set so that there is little difference in temperature between the thermistor 29 and the light emitting element 22, regardless of positions on the substrate 21.

For example, when the substrate 21 is formed, using a substrate which is obtained by covering a surface of an aluminum plate using an insulating material, it is possible to set heat conductivity of the substrate 21 to approximately 1 W/(mK) to 15 W/(mK). When the substrate 21 is formed, using an inorganic material (ceramic) such as aluminum oxide, aluminum nitride, or the like, it is possible to set heat conductivity of the substrate 21 to approximately 20 W/(mK) to 200 W/(mK).

In addition, when the substrate 21 is formed, using an organic material such as paper phenol, or glass epoxy, heat conductivity of the substrate 21 becomes less than 1 W/(mK).

According to a knowledge which the inventors obtained, even if heat conductivity of the substrate 21 is less than 1 W/(mK), when a distance between the thermistor 29 and the light emitting element 22 on the substrate 21 is set to 10 mm or less, it is possible to set so that there is little difference in temperature between the thermistor 29 and the light emitting element 22. In addition, also when heat conductivity of the substrate 21 is 1 W/(mK) or more, it is possible to set a distance between the thermistor 29 and the light emitting element 22 on the substrate 21 to 10 mm or less.

In addition, since a current flows in the resistive element 23 when applying a voltage Vin to the input terminal, the resistive element 23 generates heat.

For this reason, it is preferable to set a distance between the thermistor 29 and the resistive element 23 to be longer than a distance between the thermistor 29 and the light emitting element 22 on the substrate 21.

In this manner, it is possible to easily control a junction temperature of the light emitting element 22, since an influence caused by heat generation of the resistive element 23 can be suppressed.

Subsequently, a lighting tool for vehicle 100 according to the embodiment will be described.

As the lighting tool for vehicle 100 according to the embodiment, for example, there is a front combination light (for example, light in which a daylight running lamp (DRL), a position lamp, a turn signal lamp, and the like, are appropriately combined), a rear combination light (for example, light in which a stop lamp, a tail lamp, a turn signal lamp, a back lamp, a fog lamp, and the like, are appropriately combined), or the like, which is provided in a car.

In addition, hereinafter, as an example, a case in which the lighting tool for vehicle 100 is the front combination light which is provided in a car will be described. However, the lighting tool for vehicle 100 is not limited to the front combination light which is provided in a car. The lighting tool for vehicle 100 may be a lighting tool which is provided in a car.

Figure 9:
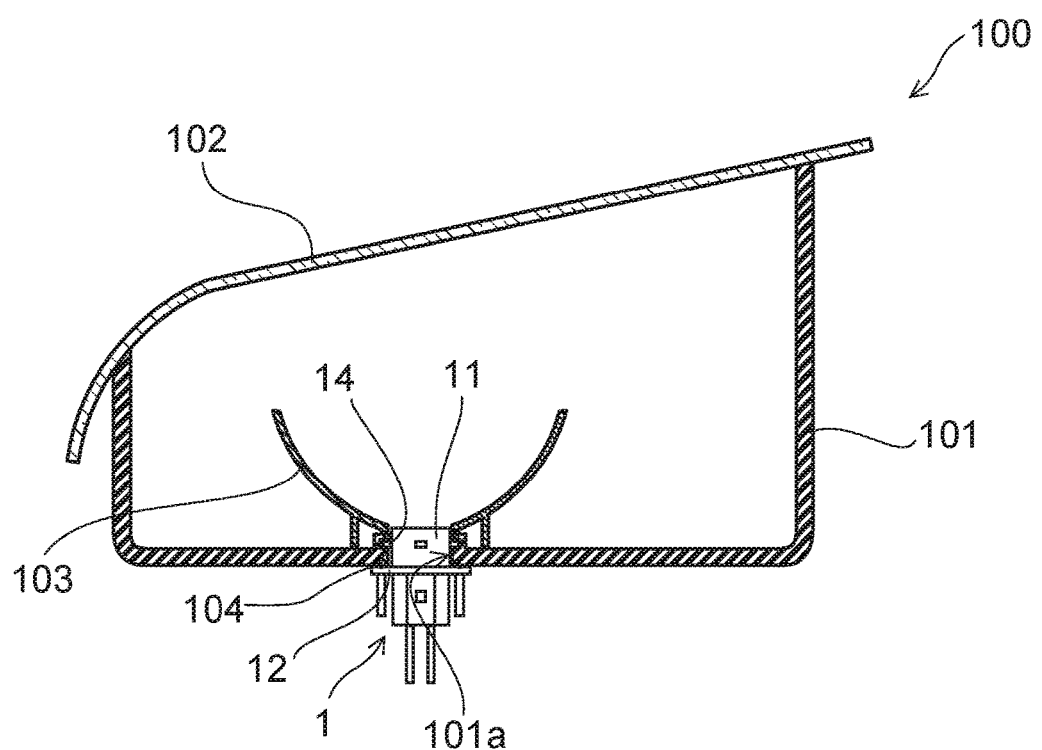
FIG. 9 is a partial sectional view which schematically illustrates a lighting tool for vehicle according to the embodiment.

FIG. 9 is a partial sectional view which schematically illustrates the lighting tool for vehicle 100 according to the embodiment.

As illustrated in FIG. 9, the lighting tool for vehicle 100 is provided with the lighting device for vehicle 1, a housing 101, a cover 102, an optical element unit 103, and a seal member 104.

The housing 101 is formed in a box shape of which one end portion side is open. The housing 101 can be formed of a resin which does not transmit light, or the like, for example.

An attaching hole 101a into which the accommodation unit 11 of the lighting device for vehicle 1 is inserted is provided on a bottom face of the housing 101.

A recessed portion into which the protrusion portion 14 is provided in the accommodation unit 11 is inserted is provided at a peripheral edge of the attaching hole 101a.

In addition, a case in which the attaching hole 101a is directly provided in the housing 101 is exemplified; however, an attaching member including the attaching hole 101a may be provided in the housing 101.

When attaching the lighting device for vehicle 1 to the housing 101, the accommodation unit 11 in which the protrusion portion 14 is provided is inserted into the attaching hole 101a, and the lighting device for vehicle 1 is rotated. Then, the protrusion portion 14 is held in the recessed portion which is provided at the peripheral edge of the attaching hole 101a.

Such an attaching method is referred to as twist-lock.

The cover 102 is provided so as to clog opening of the housing 101. It is possible to form the cover 102 using a light permeable resin, or the like.

The cover 102 can be set to a cover which functions as a lens, or the like.

Light radiated from the lighting device for vehicle 1 is input to the optical element unit 103.

The optical element unit 103 performs reflecting, diffusing, guiding, condensing, forming of a predetermined light distribution pattern, and the like, of light radiated from the lighting device for vehicle 1.

For example, the optical element unit 103 illustrated in FIG. 9 is a reflector, and forms a predetermined light distribution pattern by reflecting light which is radiated from the lighting device for vehicle 1.

When the optical element unit 103 is a reflector, it is possible to provide the optical element unit 103 in the inside of the housing 101 so as to be concentric with a center axis of the attaching hole 101a.

The seal member 104 is provided between the flange portion 12 and the housing 101.

It is possible to form the seal member 104 using an elastic material such as rubber, or a silicone resin.

When the lighting device for vehicle 1 is attached to the lighting tool for vehicle 100, the seal member 104 is interposed between the flange portion 12 and the housing 101. For this reason, an inner space of the housing 101 is sealed by the seal member 104.

In addition, the protrusion portion 14 is pushed to the housing 101 using an elastic force of the seal member 104. For this reason, it is possible to prevent the lighting device for vehicle 1 from escaping from the housing 101.

In addition, the lighting device for vehicle 1 is attached to the housing 101 so as to have an orientation in which the thermistor 29 is located above the light emitting element 22 (for example, refer to FIG. 1).

In this case, the thermistor 29 is not located above the resistive element 23.

When the thermistor 29 is located above the light emitting element 22, it is possible to reduce a difference in temperature between the thermistor 29 and the light emitting element 22. For this reason, it is possible to easily control a junction temperature of the light emitting element 22.

In addition, when it is set so that the thermistor 29 is not located above the resistive element 23, it is possible to suppress an influence caused by a heat generation of the resistive element 23. For this reason, it is possible to easily control the junction temperature of the light emitting element 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A lighting tool for a vehicle comprising:
   a lighting device;
   a housing to which the lighting device is attached,
   the lighting device comprising:
      a light emitting device;
      a power feeding terminal; and
      a socket which is fitted into the power feeding terminal,
   the light emitting device comprising:
      a substrate;
      a light emitting element which is provided on the substrate and provided in the light emitting device, wherein the power feeding terminal is electrically connected to the light emitting element;
at least one resistive element which is provided on the substrate, and is connected in series with the light emitting element; and
a thermistor which is provided on the substrate, has a positive temperature coefficient, and is connected in parallel with the at least one resistive element,
a shortest distance between the thermistor and a resistive element, of the at least one resistive element, provided closest to the thermistor on the substrate is set to be longer than a shortest distance between the thermistor and the light emitting element,
wherein the lighting device is attached to the housing so as to have an orientation in which the thermistor is located above the light emitting element, which is provided in the light emitting device, and not located above the at least one resistive element, which is located above the light emitting element.

2. The lighting tool according to claim 1, wherein heat conductivity of the substrate is set to 1 W/(mK) or more and 200 W/(mK) or less.

3. The lighting tool according to claim 1, wherein a distance between the thermistor and the light emitting element on the substrate is set to 10 mm or less.

4. The lighting tool according to claim 1, wherein the resistive element is an adjustable resistor, or a film-shaped resistor which is provided on the substrate, and a resistance value of the resistive element is set to a value in which a value of a current which flows in the thermistor is within a desired range in an environmental temperature region of approximately 85° C., and a value of a current which flows in the light emitting element is within a desired range in an environmental temperature region of approximately 25° C.

5. The lighting tool according to claim 4, wherein the film-shaped resistor includes an elimination portion which is formed by eliminating a part of the film-shaped resistor.

6. The lighting tool according to claim 5, wherein a resistance value of the film-shaped resistor is adjusted by a size of the elimination portion.

7. The lighting tool according to claim 1, wherein the resistive element is an adjustable resistor, or a film-shaped resistor which is provided on the substrate, and a resistance value of the resistive element is set to a value in which a value of a current which flows in the thermistor is within a desired range in an environmental temperature region of approximately 105° C., and a value of a current which flows in the light emitting element is within a desired range in an environmental temperature region of approximately 25° C.

8. The lighting tool according to claim 1, wherein the resistive element is an adjustable resistor, or a film-shaped resistor which is provided on the substrate, and a resistance value of the resistive element is set to a value in which a junction temperature of the light emitting element does not exceed a maximum junction temperature in an environmental temperature region of approximately 85° C., and brightness of the light emitting element becomes a value within a desired range in an environmental temperature region of approximately 25° C.

9. The lighting tool according to claim 1, wherein the resistive element is an adjustable resistor, or a film-shaped resistor which is provided on the substrate, and a resistance value of the resistive element is set to a value in which a junction temperature of the light emitting element does not exceed a maximum junction temperature in an environmental temperature region of approximately 105° C., and brightness of the light emitting element becomes a value within a desired range in an environmental temperature region of approximately 25° C.

10. The lighting tool according to claim 1, wherein, when an environmental temperature rises, a resistance value of the thermistor increases.

11. The lighting tool according to claim 1, wherein, when an environmental temperature rises, a value of combined resistance of a parallel circuit which is formed of the resistive element and the thermistor increases, and a value of a current which flows in the parallel circuit, and a value of a current which flows in the light emitting element decrease.

12. The lighting tool according to claim 10, wherein the environmental temperature is −40° C. to 85° C.

13. The lighting tool according to claim 10, wherein the environmental temperature is −40° C. to 105° C.

14. The lighting tool according to claim 1, wherein Curie temperature of the thermistor is 65° C. or more and 140° C. or less.

15. The lighting tool according to claim 1, wherein a material of the substrate is ceramic.

16. The lighting tool according to claim 1, wherein a material of the substrate is obtained by covering a surface of an aluminum plate using an insulating material.

17. The lighting tool according to claim 1, wherein the light emitting element is provided on the substrate using a chip on board (COB) method.

* * * * *